Aug. 8, 1967  B. L. SMITH  3,334,580
APPARATUS FOR MANUFACTURING STRUCTURAL WOODEN DEVICES
Filed Sept. 9, 1966  4 Sheets-Sheet 1

INVENTOR.
BERNY L. SMITH
BY
ATTORNEYS

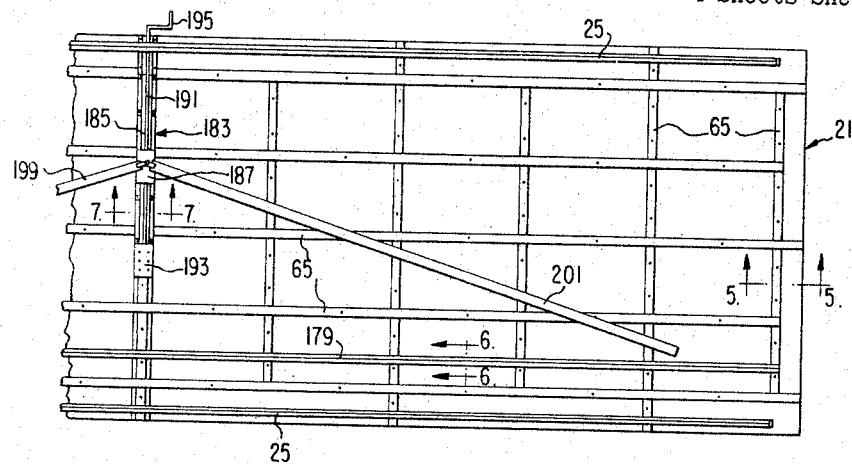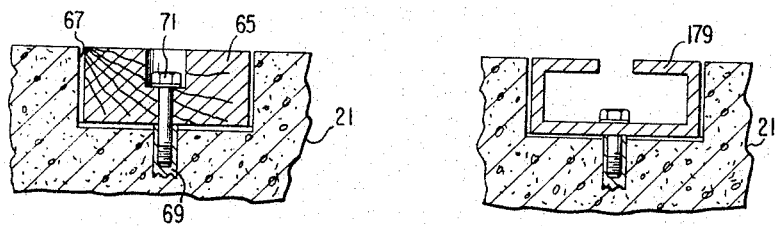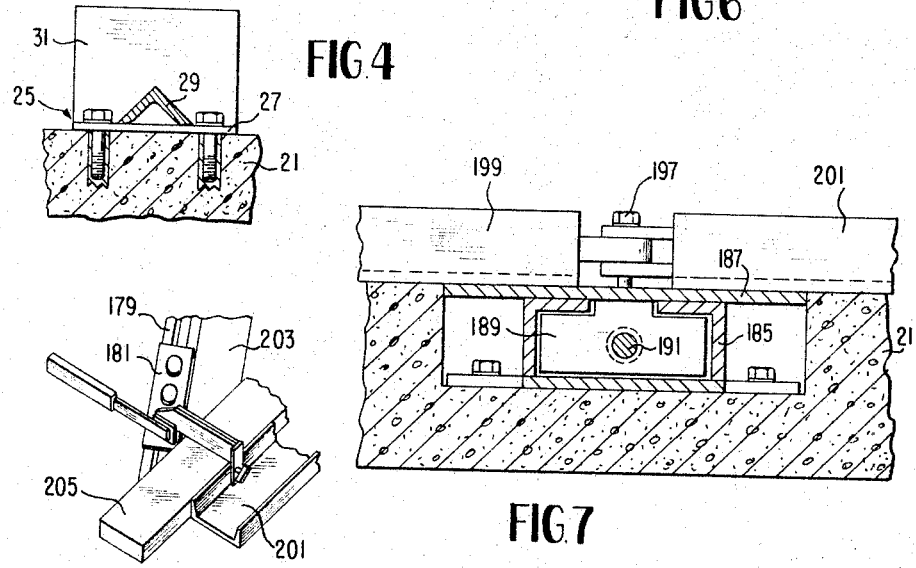

INVENTOR.
BERNY L. SMITH
BY
ATTORNEYS

United States Patent Office 3,334,580
Patented Aug. 8, 1967

3,334,580
APPARATUS FOR MANUFACTURING
STRUCTURAL WOODEN DEVICES
Berny Lee Smith, Miami, Fla., assignor to Automated
Building Components, Inc., Miami, Fla., a corporation
of Florida
Filed Sept. 9, 1966, Ser. No. 578,409
26 Claims. (Cl. 100—226)

This is a continuation-in-part of applicant's copending application Serial No. 512,652, filed December 9, 1965.

This invention relates to an apparatus and method for manufacturing structural wooden devices, and more particularly relates to an apparatus for forming the joints in such structural wooden devices as roof trusses and the like.

With the advent of the Jureit connector plate of Jureit U.S. Patent No. 2,877,520, it became possible to manufacture structural wooden devices such as roof trusses without the necessity of manual nailing, bolting or gluing. These connectors comprise steel plates having slender, elongated nail like teeth struck therefrom in three or more rows so as to extend substantially perpendicular to the plate. Structural wooden butt joints may be formed with such connectors by simply sandwiching the two butted wooden members between pairs of the Jureit plates and simultaneously pressing the teeth of both plates into the lumber to form a completed joint. The operation is rapid, low in cost, and provides a built-in quality, in that there is no necessity to rely upon the proper number of nails, bolts or other fasteners being manually affixed in the formation of the joints. The adoption of such joints was widespread in the residental housing industry and created a demand for presses capable of performing the aforementioned sandwich-pressing operation.

As a result of that demand, numerous presses of varying types were developed and found commercial usage in the roof-truss industry. Examples of such presses are found in Jureit U.S. Patents Nos. 3,079,607 and 3,195,-449, Moehlenpah U.S. Patents Nos. 3,068,483 and 3,068,-484, and Black U.S. Patent No. 3,100,301. Such presses make it possible to handle a high volume of roof truss work at high speed and in an economical fashion, when a relatively large number of trusses of the same type are being produced. Under such circumstances, trained crews utilizing presses such as that shown in Jureit Patent No. 3,195,449, can manufacture roof trusses at the rate of one truss per minute.

As the use of the Jureit-type connectors of Patent No. 2,877,520, become more widespread, builders and architects switched more and more to the use of roof trusses in place of conventional framing. As this shift occured, the demand grew of the production of widely varying types of trusses which would permit architects a freedom of roof design which would allow the erection of low-cost homes with varying roof lines, so as to avoid the growth of developments wherein all houses were identical. This demand for so-called "special" trusses or "specials" led to the development of special jigs of high adjustability, such as those shown in Jureit U.S. Patents Nos. 3,241,585 and 3,238,867. These jigs permitted variation of the truss setup in order to handle a large number of different truss designs. However, the change-over of the jig consumed time, with the result that the price of this type of truss was higher than the trusses which would be manufactured in production runs of the same type truss. The same was true to an even more exaggerated degree with those nonjig type press systems wherein a modification of the type of truss meant a moving of the presshead stands.

According to the present invention, it has now been found that it is possible to manufacture an almost endless variety of roof trusses and like structural devices through the use of a relatively simple apparatus which can be made available to truss fabricators, lumberyards and similar operators at only a fraction of the cost involved in either the purchase or lease of presses of the aforementioned types. This reduction in cost and facilitation of the manufacture of widely varying truss types is of significant value not only to present truss fabricators, who can add to their truss-producing capabilities, but also is important to the smaller operator who either cannot afford a press or whose production needs are so low that setting up such truss-production machinery is not warranted. Thus, the apparatus of the invention brings truss production within the capabilities of a large number of small operators who heretofore could not justify the use of roof trusses, despite their many constructional and economic advantages.

According to the invention, it has been found that it is possible to manufacture structural wooden butt joints and wooden devices made therewith, such as roof trusses, utilizing connector plates such as the Jureit connector plate of Jureit Patent No. 2,877,520, by doing away with the action-reaction, relatively steady application of force utilized in manufacture carried out with the previously discussed presses. As contrasted to this, the apparatus of this invention provides for a seating of the connector plates through the impulse-momentum principle without the necessity of a press. In utilizing this principle, there is provided a relatively unyielding and inelastic bed or slab over which there is movably mounted a relatively heavy weight which is capable of being positioned over the connector plates to be embedded in the wooden members to be joined. The weight is suspended by means of a mechanism capable of lifting it to the desired height and then releasing the weight for a free-fall, whereby the accelerating weight, which has a flat lower surface, strikes the connector and embeds the same in the wood in a contact or collision which is preferably as close as possible to inelastic. The weight may then be lifted, moved to the next joint, released and allowed to accelerate to the point of impact, whereby the next connector is embedded.

In utilizing the apparatus, it is possible to either embed a sandwich of two connectors on opposite sides of the lumber at one time or to embed a connector into only one surface of the lumber, later "flip-flopping" the lumber to permit the embedding of connectors in the opposite surface thereof. Obviously the simultaneous sandwich procedure is more desirable, in that it permits taking full advantage of the manifold new results secured with the type of connector described in Jureit Patent No. 2,877,520. According to the invention, the bed or slab may be fitted with jig fixtures for securing the lumber in position during the embedding operation or, in the alternative and as a significant feature of this invention, the surface of the bed or slab may be provided with a network of wooden members suitably spaced and arranged for the purpose of securing thereto temporary holding or positioning blocks for the lumber. As another alternative, for very small operators, it is possible to operate without jig fixtures by preliminarily securing the lumber together as by stapling or the use of corrugated fasteners, toenailing or the like.

It will be apparent to those skilled in the art that while the truss-manufacturing apparatus of this invention is most particularly adapted to and is most advantageous in the formation of structural joints with connector plates having slender, elongated nail-like teeth, such as, for example, those illustrated in Jureit Patent No. 2,877,520, the device also has utility in the embedment of plates utilizing triangular-shear-type teeth, such as, for example, plates of the Sanford type, shown in Sanford U.S. Patent No. 2,827,676, plates of the Ronel type, shown in Lidsky U.S. Patent No. 2,974,378, and plates of still other configurations.

It is, accordingly, a primary object of the present invention to provide an improved apparatus for forming structural wooden devices utilizing connector plates having integral teeth.

It is another object of the invention to provide an improved apparatus for forming structural wooden devices with connector plates without necessitating the use of presses or the action-reaction principle.

It is still another object of the invention to provide an improved apparatus for manufacturing structural wooden devices containing structural butt joints with connector plates having integral teeth extending therefrom, through use of the impulse-momentum principle.

It is a further object of the invention to provide an apparatus of the foregoing type for manufacturing structural butt joints and devices formed therewith which is highly economical in that a minimum investment is required in order to commence the manufacture of trusses.

It is another object of the invention to provide an improved apparatus for manufacturing structural wooden devices containing structural butt joints with connector plates having integral teeth extending therefrom through the use of the impulse-momentum principle utilizing a highly effective and inexpensive means for quickly assembling and holding in position a wide variety of different shapes and sizes of such structural wooden device.

It is still another object of the invention to provide an improved apparatus of the foregoing type wherein the aforementioned means for holding the structural element in assembled fashion is simple in construction and capable of easy construction in the field.

It is still another object of the invention to provide an improved apparatus of the foregoing type wherein the means assembling the structural elements and holding them in position requires no special tools in use but rather is capable of use by personnel having only the most rudimentary knowledge of carpentry skills.

It is still another object of the invention to provide an improved apparatus of the foregoing type which permits of the manufacture of variations in structural device shapes and sizes of a literally infinite number.

It is another object of the invention to provide an apparatus of the foregoing type which makes possible the economic manufacture of a wide variety of different truss types, commonly referred to as "specials."

It is still another object of the invention to provide an apparatus of the foregoing type which may be made available to the trade at a sufficiently low price to permit roof-truss manufacture by so-called "small operators" whose financing or volume of production is such that the use of the more expensive presses is not feasible.

It is still another object of the invention to provide an apparatus of the foregoing type which is versatile in that it may be used with or without various forms of fixtures for preliminary securing of the wooden devices in assembled relation.

It is another object of the invention to provide an apparatus for manufacturing structural devices comprising wooden members having butt joints connected by toothed connector plates comprising a bed of nonyielding and nonresilient material providing a hard surface for such wooden members, a weight suspended over the bed for translational movement to permit positioning of the weight over the several connector plates used in forming the joints, and a suspending means for lifting and releasing the weight to permit it to fall and thereby embed the teeth of the connector plates in the wooden members.

It is another object of the invention to provide an apparatus of the foregoing type wherein the bed is provided with a grid of wooden members to which fixtures may be temporarily attached for the purpose of locating the wooden members of the structural devices in a predetermined assembled relation.

It is another object of the invention to provide an apparatus for manufacturing structural devices comprising wooden members having butt joints formed by toothed connector plates comprising a substantially nonyielding and nonresilient concrete bed for receiving the wooden members and connector plates, a grid of wooden anchor strips mounted in the bed surface for temporarily attaching fixtures to such surface with the top surfaces of the anchor strips lying substantially flush with the bed surface, a gantry-type frame mounted for rolling movement along tracks mounted on the bed and including transverse rails extending between the upper ends of the upright frame members of the gantry-type frame, a weight suspended from a carriage movably mounted on such transverse rails for impacting against the members of a structural device lying on the bed, guide means for the weight comprising telescoping pipes with one of the pipes rigidly attached to the carriage and the other rigidly attached to the weight, means for raising and releasing the weight including a drum rotatably mounted on the carriage, a flexible tension member connected between the drum and the weight and adapted to be wound around the drum to raise the weight, drive means operatively connected to the drum, and selectively engageable clutch means interposed between the drive means and the drum with means for suspending the weight comprising a ratchet member rotatable with the drum and pawl means pivotally mounted on the carriage for selective engagement with the ratchet member to prevent rotation of the drum in a direction to permit the fall of the weight, and handle means mounted on the carriage enabling an operator to position the gantry frame relative to the bed and carriage relative to the gantry frame, and control means for the clutch and pawl mounted adjacent to the handle means.

It is another object of the invention to provide a bed for use in the manufacture of structural devices comprising wooden members having butt joints formed between the wooden members by toothed connector plates comprising a three-dimensional body formed of a substantially nonyielding and nonresilient material providing a hard flat surface for receiving the wooden members and the connector plates of the structural devices and including a network of wooden members permanently secured to the body whereby fixtures may be temporarily attached thereto for locating the wooden members of the structural devices.

It is still another object of the invention to provide a weight suspension unit for use in connection with a flat bed in the manufacture of structural devices comprising wooden members having butt joints formed between the wooden members by toothed connector plates, comprising a gantry-type frame having support wheels for rolling translational movement in one direction relative to the bed, such frame including a rail member extending in a direction transverse to that one direction of movement, carriage means mounted on the rail member for rolling translational movement therealong, a weight having a surface for engaging a connector plate, means for suspending the weight, including means for lifting and releasing the weight to permit it to fall and thereby embed the teeth of a connector plate in a wooden member, and guide means mounted for translational movement with the carriage means for accurately directing the path of the weight on release thereof.

It is still another object of the invention to provide a method for manufacturing structural devices from wooden members and toothed connector plates comprising disposing connector plates on an unyielding low elasticity bed with their toothed surfaces upward, laying wooden members over such connector plates with the wooden members butted over such connector plates, preliminarily securing the wooden members together in butted relation, placing further connector plates over such butted wooden members with their toothed surfaces downward, releasing a weight for free fall over one of such butt joints to press the teeth into the wooden members, and lifting the weight and moving it to a position over a second butt joint and releasing the weight for free fall.

These and further objects and advantages of the invention will become more apparent upon reference to the following specification and claims and appended drawings, wherein:

FIGURE 3 is a partial plan view of the bed of the apparatus of FIGURE 1;

FIGURE 4 is a vertical section taken along the line 4—4 of FIGURE 1, showing a track detail;

FIGURE 5 is a vertical section taken along the line 5—5 of FIGURE 3;

FIGURE 6 is a vertical section taken along the line 6—6 of FIGURE 3;

FIGURE 7 is a vertical section taken along the line 7—7 of FIGURE 3;

FIGURE 8 is a fragmentary perspective view of a certain type jig for use with the apparatus of FIGURE 1;

Figure 1:
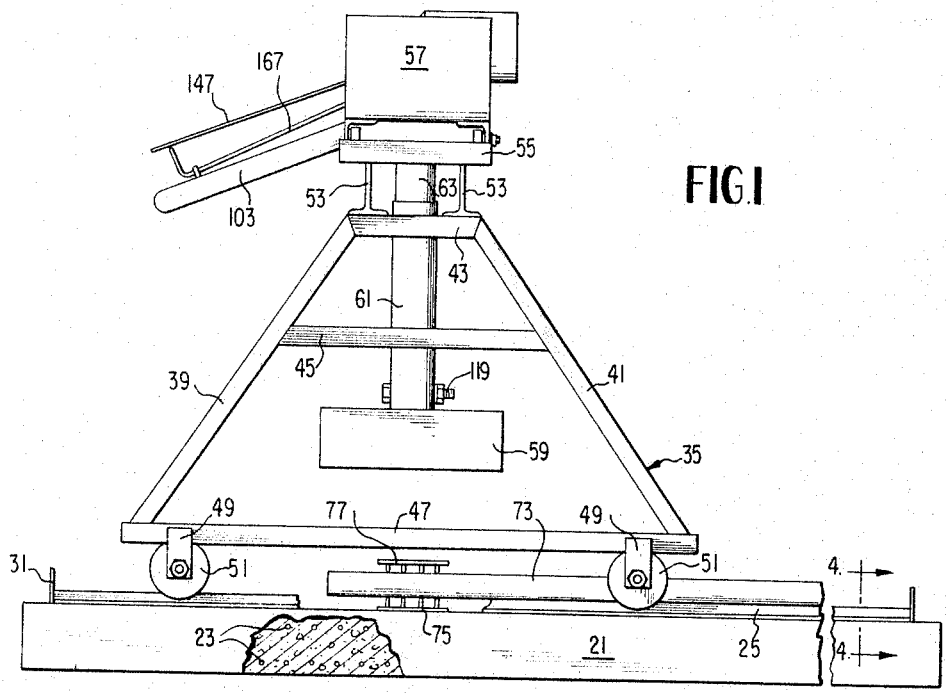
FIGURE 1 is a side elevation of a structural device manufacturing apparatus construction according to the present invention.
Figure 2:
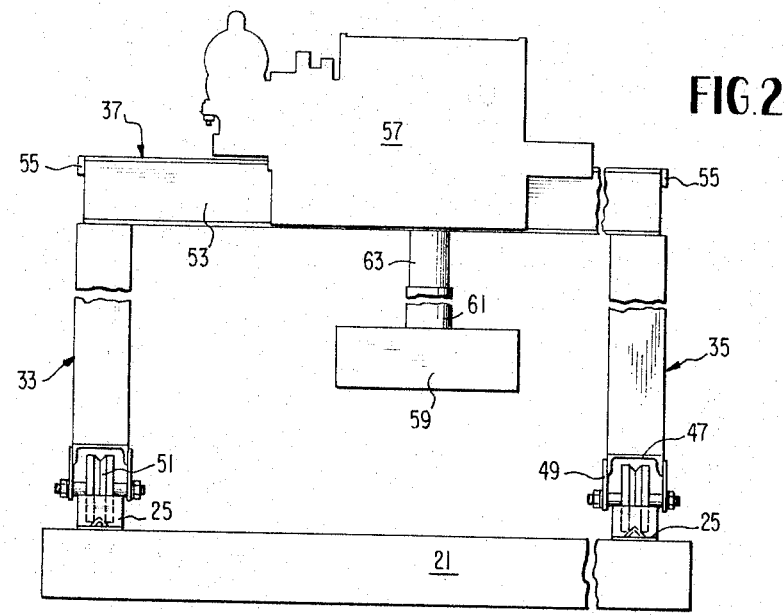
FIGURE 2 is an end elevation of the apparatus of FIGURE 1 showing the means for suspending the weight in outline form only.

Referring now to the figures of the drawing, and particularly to FIGURES 1 and 2, there is seen a bed or slab 21 which may be rectangular in shape having, for example, a long dimension of 52 feet and a short dimension of 15 feet. This bed or slab 21 may be formed, for example, of reinforced concrete having a depth of approximately 12 inches. A preferred composition of the slab is that it be formed from a first layer of 4500 pound concrete having a thickness of approximately 8 inches and including suitable reinforcing steel, and a second layer of 4500 pound concrete having a thickness of approximately 4 inches and including suitable reinforcing steel. An abrasion resistant hardener may be provided on the surface of the second layer during the forming thereof.

According to the invention, the material for fabricating the bed is chosen to provide an unyielding bed having a low resiliency or elasticity. It has been found that such a bed effectively absorbs the impulse blow of a weight raised a suitable distance above the surface of the bed and then released for gravity acceleration and impact with a structural device lying on the bed. The material chosen for the bed should also be capable of providing a durable, abrasion resistant surface to produce a bed having a useful life.

A pair of parallel tracks 25 are mounted on the upper surface of the bed adjacent to the long edges thereof, respectively. As best shown in FIGURE 4, these tracks are formed from one or more sections each comprising a base plate 27 having welded or otherwise secured thereto an angle 29 disposed with the apex of the angle directed upward. End stops in the form of plates 31 are welded to the end sections of the tracks 25 to limit the movement of the track mounted device.

Supported on the tracks 25 is a traveling gantry type frame comprised of upright A-frame structures 33 and 35 and a transverse connecting rail structure 37. The A-frames 33 and 35 are identical and are preferably constructed from channels fabricated by welding. Each A-frame includes two upright members 39 and 41 and upper, intermediate, and base horizontal members 43, 45 and 47 respectively. Brackets 49 are welded or otherwise secured to the base members 47 defining bearings for V-groove wheels 51 which roll along the tracks 25.

The rail structure 37 comprises a pair of spaced parallel I beams 53 supported at their respective ends by the upper horizontal members 43 of the A-frames, and rigidly secured thereto as by welding. Plates or straps 55 define suitable end stops which are welded to the ends of the parallel I beams.

A carriage 57, shown only in outline in FIGURE 2, is supported for rolling movement along the rail structure 37, as will be described subsequently. This carriage supports a drop hammer or weight 59 which may, for example, take the form of a circular steel plate having a thickness of 6 inches and a diameter of 16 inches. The weight is raised, by a mechanism to be described, and then permitted to fall free to impact a connector plate lying over butted wooden members of a structural device to drive the connector plate into the wooden members. The weight 59 is guided in its vertical movements by telescoping pipe sections 61 and 63, the smaller section 63 being secured to the carriage 57 in a manner to be described and the larger section 61 being rigidly secured to the weight as by welding. It will be seen then that the carriage 57 is capable of transverse movement along the rail structure 37 while the gantry frame is movable longitudinally of the bed 21 so that the weight 59, suspended from the carriage 57, may be moved to any desired position over the bed. With a bed having dimensions as above described, the weight may be positioned within an area 13½ feet wide by 46 feet in length, so that a wide variety of trusses or similar components may be fabricated. With the vertical guide means provided by the telescoping pipe sections 61 and 63, the impact area of the weight on the bed can be predetermined accurately by the operator to obviate damage to fixtures or articles which may be lying on the bed.

In FIGURE 1, a roof truss or the like is shown in position on the bed 21, the roof truss being indicated by a member 73 which may be a horizontal member of the truss. Lower and upper connector plates 75 and 77 are shown; the plate 75 lying on the bed surface with its teeth extending upwardly and the truss member 73 being supported on the plate along with a truss member which is to be assembled in butted relation with the member 73. The upper connector plate 77, with its teeth extending downwardly, is placed over the butted truss members and in vertical alignment with the lower plate 75. The truss members may be preliminary held in assembled relation, by fixtures or other means to be described; and the butted truss members and connector plates defining a sandwich arrangement to be impacted by the weight 59 to embed the teeth of the connector plates into the truss members, thereby forming a sandwich joint.

Referring to FIGURE 3, there is shown the surface of the bed 21 and a particularly effective inexpensive means for locating or securing, on the bed, the members of the structural devices which are to be fabricated thereon. This form of locating means is provided by a grid of wooden strips 65, such as 2 x 4's, lying in grooves 67 suitably formed in the bed surface during the fabrication of the bed (see FIGURE 5). While these wooden strips may be incorporated into and suitably anchored to the bed surface, during the fabrication of the bed, it is preferable that the bed surface be formed with suitable grooves for later receiving the wooden strips 65. With the bed being formed in this manner, the wooden strips may be shimmed while being secured in the respective grooves to assure that the upper surfaces of the strips will be perfectly flush with the surface of the bed. Further, since these strips may be used for the purpose of securing blocks or cleats to the bed by means of nails, screws, or similar device, the wooden strips may in time become mutilated or worn so that replacement is necessary. The strips may then be readily replaced as necessary during the useful life of the bed surface. As best shown in FIGURE 5, the wooden strips 65 may be secured to the bed by means of threaded concrete anchoring devices 59 provided in the bases of the grooves and which are adapted to receive bolts 71, the wooden strips 65 being bored and counterbored to receive the bolts 71 below the plane of the bed surface.

Figure 9:
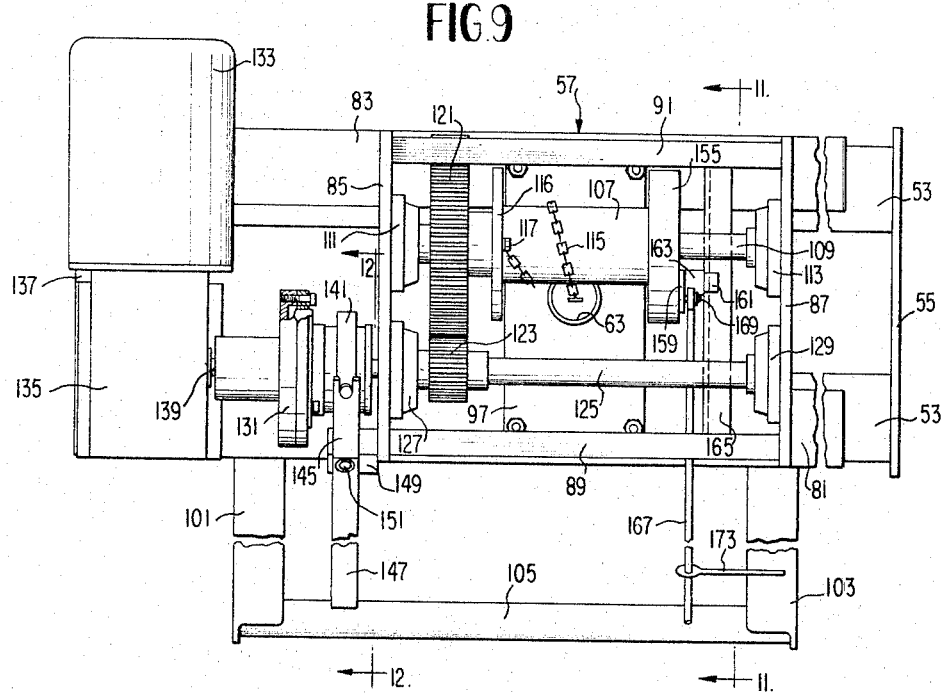
FIGURE 9 is a plan view and FIGURE 10 is an end elevation of the weight suspending means shown in outline in FIGURE 2.
Figure 10:
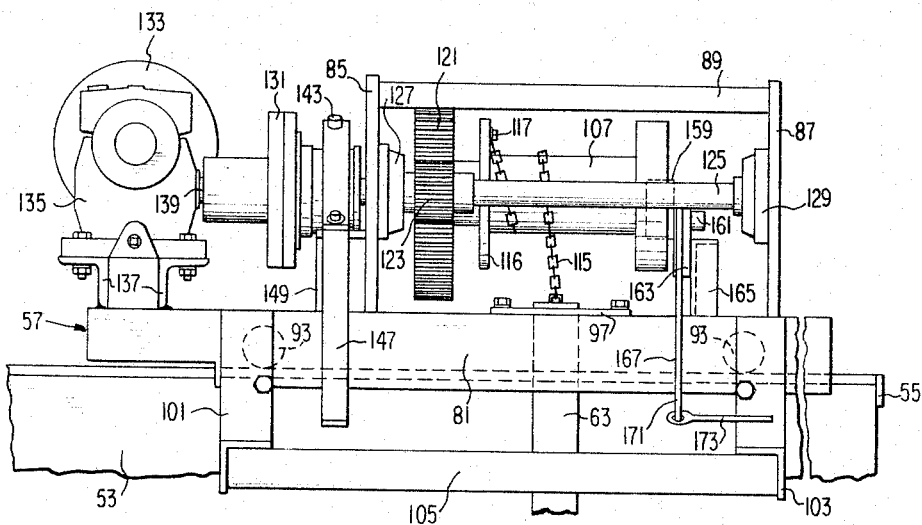
Figure 11:
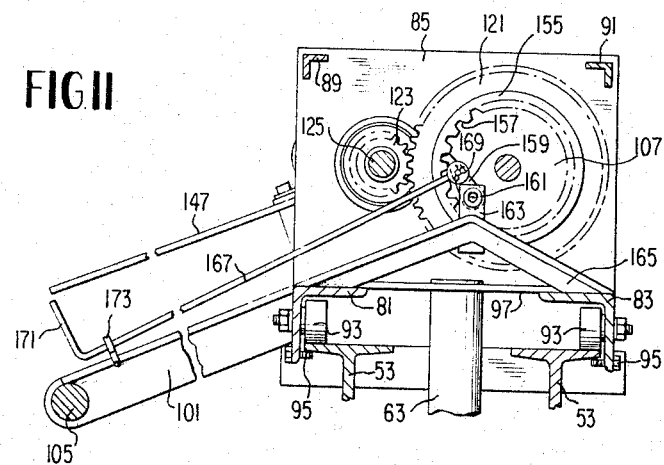
FIGURE 11 is a vertical section taken along the line 11—11 of FIGURE 9.

The structure of a carriage 57 is best shown in FIGURES 9 through 12. The carriage frame is preferably a welded structure formed from relatively heavy parallel angles 81 and 83, which define the base of the carriage, vertical end plates 85 and 87, and upper angles 89 and 91 which connect and support the upper extremities of the end plates to define a rigid structure. The vertical flanges of the base angles 81 and 83 extend downwardly outside of the outer edges of the upper flanges of the I beams 53 of the gantry rail structure 37, and in relatively close proximity to the edges of the I beams, to retain and guide the carriage as it moves along the rail structure. A pair of wheels 93 are supported in suitable axle blocks which are secured to the vertical flanges of each of the angles 81 and 83, adjacent either end thereof, the wheels rolling on the upper flanges of the respective I beams 53. As best seen in FIGURE 11, bolts 95 are secured to the downwardly extending flanges of the base angles 81 and 83 and extend horizontally inward underlying the upper flanges of the I beams 53, to prevent substantial upward movement of the carriage relative to the I beams. These bolts 95 thus provide a safety feature for preventing accidental dislodgment of the carriage 57 relative to the rail structure 53.

The upper pipe 63 of the telescoping pipe guide assembly for the weight 59 is secured as by welding to a rectangular plate 97 which is bolted to the horizontal flanges of the base angles 81 and 83 of the carriage, as best seen in FIGURES 9 and 10. As already described, the larger pipe 61, carrying the hammer 59, is telescoped over the pipe 63 to guide the hammer 59 in a precise vertical path.

The carriage is provided with a rugged handle assembly consisting of side brackets 101 and 103 formed from angles welded or otherwise suitably secured to the base angle 81, the outer extremity of the brackets carrying a handle bar or pipe 105 which extends generally parallel to the base angles. The brackets 101 and 103 extend outwardly and downwardly from the carriage frame to locate the handle bar 105 at a convenient height for an operator who is standing on the bed 21 and also to position the operator an appropriate horizontal distance from the weight 59 to minimize the possibility of injury to the operator due to inadvertent release of the hammer. It will be apparent that the handle bar 105 is used by the operator both for the purpose of pushing or pulling the gantry frame along the bed 21 and for moving the carriage 57 along the rail 73 of the gantry frame. As best seen in FIGURES 9 and 10, the ends of the carriage base angles 81 and 83 will engage the stop bars 55 of the rail structure 37 to limit the movement of the carriage along the rail structure and to define the position limits for the transverse movements of the hammer 59 relative to the bed 21.

The carriage 57 supports the mechanism for lifting, suspending and releasing the weight 59. The lifting member consists of a drum 107 nonrotatably mounted on a drum shaft 109 which is rotatably supported in bearings 111 and 113 mounted on carriage end plates 85 and 87, respectively. A chain 115 is wound about the drum 107, one end of the chain being secured to a drum flange 116 by means of a bolt assembly 117, the chain extending downwardly from the drum through the telescoped pipes 63 and 61 and being secured to a bolt assembly 119 extending through the lower pipe 61 adjacent to the weight 59.

The drum shaft 109 also carries a relatively large gear 121 which is nonrotatably mounted on the shaft. The gear 121 meshes with a relatively small gear 123 nonrotatably mounted on a clutch shaft 125 which is rotatably mounted in bearings 127 and 129 mounted on the carriage end plates 85 and 87, respectively. The clutch shaft 125 extends through the carriage end plate 85 and carries a clutch 131 which may be a friction clutch or other suitable clutch adapted to be selectively engaged and disengaged to couple the clutch shaft to a power source.

A preferred power source is a combined electric motor 133 and gear reduction mechanism 135 which are suitably supported on a platform consisting of angles 137, welded or otherwise rigidly attached to the carriage base angles 81 and 83, as best shown in FIGURE 10. The motor-gear reduction combination is supported at a suitable height so that the output shaft 139 is aligned with the clutch 131 carried on the clutch shaft 125. The output shaft 139 is coupled to the driving member of the clutch 131 to drive this member continuously; and the clutch may be selectively engaged to drive the clutch shaft 125. The driving speed of the drum 107 is reduced both by the above mentioned gear reduction mechanism 135 and also by a speed reduction effected through the gears 123 and 121.

Figure 12:
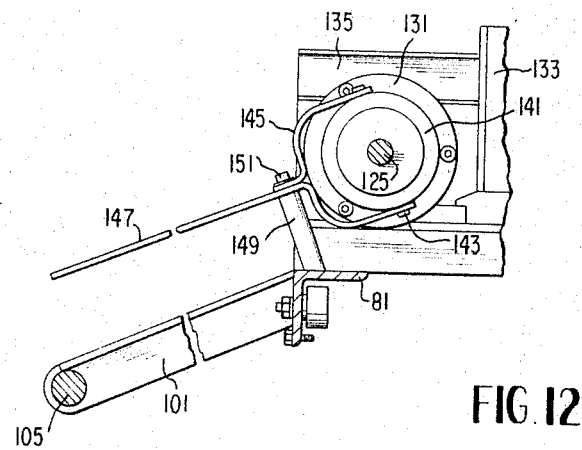
FIGURE 12 is a vertical section taken along the line 12—12 of FIGURE 9.

In the illustrated clutch 131, engagement and disengagement of the clutch is effected by means of an axially movable collar 141 having radially projecting bosses 143 adapted for engagement by the yoke 145 of clutch control lever 147. As best seen in FIGURES 9, 10 and 12, the clutch control lever 147 is pivotally mounted on a support bracket 149 by means of a bolt 151, the support bracket 149 being secured as by welding to the carriage base angle 81. The clutch control lever 147 extends from the clutch in the direction of the handle bar 105 in position to be readily manipulated by the operator.

The mechanism for suspending the weight 59 is a ratchet and pawl mechanism associated with the drum 107. For this purpose the drum is preferably provided with an enlarged flange 155 incorporating a ratchet wheel in the form of an internal annular gear 157. A pawl 159 is pivotally mounted, relative to the carriage, to be selectively engaged with the teeth of the internal gear to lock the gear and drum 107 against rotation in the counterclockwise direction, as viewed in FIGURE 11, the direction in which the drum is urged to rotate by the suspended weight 59. The pawl 159 is pivotally mounted by means of a pin 161 on an upwardly extending pivot block 163 secured as by welding to an inverted V-shaped bracket 165. The bracket 165, formed from angles, is secured as by welding to the carriage base angles 81 and 83, and spans these angles to define a rigid support for the pawl 159.

The pawl is manually pivoted into and out of engagement with the internal gear 157 by means of an operating lever 167. This lever is in the form of a rod having an eye at one end which receives a boss 169 extending from the pawl in spaced parallel relation to the pivot axis of the pawl. The other end of the rod 167 extends toward the handle bar 105, and is guided and supported for reciprocating motion by means of a suitable bracket 173 welded or otherwise secured to the handle bracket 103. The outer extremity of the rod 167 is bent upwardly to define a handle 171, this handle being located close to the handle bar 105, readily accessible to the operator. The pivotal movement of the pawl 159 out of engagement with the ratchet gear 157 may be limited by engagement of the handle 171 with the support bracket 173.

As best shown in FIGURE 11, when the pawl lever 167 is pulled toward the operator and away from the carriage, the pawl is pivoted to the indicated postiion where it will ratchet when the drum is rotated in a clockwise direction and where it will prevent counterclockwise rotation of the drum. The pawl will be maintained in this position by the overcenter arrangement of the pawl relative to its pivot axis and by the weight of the control lever 167 which extends downwardly from the pawl. The pawl is so designed and mounted relative to the drum and the ratchet gear 157, that the pawl is self-locking with the gear by virtue of the load placed on the drum through the suspended weight 59. That is, in order for the pawl to be disengaged from the gear 157 the drum must first be rotated clockwise by the power source to permit the operator to pivot the pawl clockwise relative to its pivot axis by pushing the control lever 167 toward the carriage. This arrangement provides a safety feature for the operator, or for others working the area of the described apparatus, in that it is unlikely that the pawl may be inadvertently disengaged from the ratchet gear 157 through accidental movement of the control lever 167. In order for the operator to release the pawl then, to effect the free fall of the weight 59, the operator must first engage the clutch to rotate the drum clockwise momentarily while simultaneously shifting the pawl to the nonengaging position, then disengage the clutch to permit free rotation of the drum under the free falling weight 59.

The following is a brief description of the method of operation:

Assuming a bed or slab 21 with a grid of wooden strips 65 as above described, very simple jig fixtures such as wooden blocks or cleats may be temporarily secured to the strips by means of nailing, or in any other suitable manner, for the purpose of locating precut wooden members of a structural device in the desired assembled relation. This technique is particularly desirable for the fabrication of a relatively small run of roof trusses having the same configuration. The lower connector plates 75 are then placed on the bed 21 beneath the locations of the intended butt joints with their teeth extending upwardly as indicated in FIGURE 1. The wooden members of the roof truss are then laid over the lower connector plates, and are held in the desired assembled butted relation by the appropriately placed wooden blocks nailed to the strips 65. The upper connector plates 77 are then placed in position over the butt joints in vertical alignment with the respective lower connector plates. The operator then moves the gantry frame and the carriage 57, by means of the handle bar 105, to position the weight 59 successively over the several sandwich joints. When the motor 133 is turned on, the driving member of the clutch is continuously rotated in a counterclockwise direction, as viewed in FIGURES 11 and 12, to drive the drum 107 clockwise when the clutch is engaged. When rotated in this direction, the chain 115 is wound around the drum to lift the weight 59. For accurately aligning the weight 59 over a joint, the weight may first be raised to a height just sufficient to clear the upper connector plates by moving the pawl 159 to the ratcheting position, as best shown in FIGURE 11, and engaging the clutch for an appropriate length of time. When the clutch is disengaged by the operator, the weight will be suspended at the desired height to move the weight over the joint for proper vertical alignment. With the gantry frame and carriage appropriately positioned, the weight 59 is further raised by the operator to the desired height for producing an impulse below of sufficient force to fully embed the connector plates into the wooden members, without damaging these members. With some experience, an operator can well estimate the height to which the hammer should be raised as determined by the size of the connector plates to be embedded and the hardness of the wooden members. Occasionally it may be necessary to raise the hammer for a second blow to fully embed the connector plates.

The weight may be raised to the desired height and immediately released by engaging the clutch, disengaging the pawl from the ratchet gear during the upward movement of the weight, then disengaging the clutch to permit the free fall of the weight. If it is desired to suspend the weight at its upper limit of movement prior to release, the weight is first raised to the desired height with the pawl engaged. Then, the weight is reelased by simultaneously engaging the clutch momentarily to permit release of the pawl by pushing the pawl control handle 171 toward the carriage, then disengaging the clutch allowing the weight 59 and the integral pipe 61 to fall free. The weight then accelerates and impacts with the upper connector plate 75 and, in preferably one impulse-momentum transfer operation, completes the joint. The process is then repeated to position and raise the weight in a similar manner over the next joint to be formed.

With the grid of wooden strips as above described, it is possible to use a variety of types of jig fixtures which may be secured to the wooden strips, and which may range from very simple locating blocks to very elaborate and versatile fixtures which preliminarily clamp the wooden members in assembled relation. Examples of such fixtures are jig fixtures of the type shown in Jureit Patents Nos. 3,241,585 and 3,238,867. Alternatively, in a very economical operation, it is also feasible to operate the apparatus without any type of fixtures for initially and preliminarily positioning the wooden members in assembled butted relation. Thus, according to the invention, it is possible to simply paint a truss configuration, or several configurations in different colors, on the surface of the bed or slab 21. The cut truss members may then be laid on the bed in the positions indicated by the painted trusses, and the wooden members preliminarily secured together as by stapling, fastening with corrugated fasteners, or toenailing. The connector plates may be positioned, and the weight 59 may be positioned and impacted with the connector plates in the same manner as above described. It will be appreciated that the technique of painting selected truss configurations on the bed may be employed whether or not the bed is provided with the described grid of wooden strips 65.

The particular form of jig fixture which is particularly adapted for use in the above described device is illustrated in FIGURES 3, 6, 7, and 8. This fixture is a commercially available fixture identified as a Whipple Roof Truss Fixture. The Whipple fixture includes a slide channel 179, best shown in FIGURES 3 and 6, which is disposed in a groove parallel and adjacent to one long side of the bed 21. This channel is C-shaped in cross section having an upwardly exposed center slot; and the channel is received in a groove in the bed surface so that the top surface of the channel is flush with the surface of the bed. The channel 179 is permanently secured within the groove by means of bolts threaded into appropriate anchoring devices. This slide channel 179 receives and supports blocks which may be appropriately positioned along the slide channel to locate the horizontal chord or base member of a roof truss; and the slide channel also locates and supports cam lock clamps 181, shown in FIGURE 8. While only one slide channel 179 is shown, one or more additional parallel slide channels may be provided for a more versatile fixture. The Whipple fixture also includes a center screw assembly 183 which is disposed in a transverse groove in the bed surface located intermediate the ends of the bed. As best shown in FIGURE 7, this assembly includes a C-shaped slide channel 185 permanently secured within the groove by means of bolts threaded into appropriate anchoring devices. A sliding assembly includes a plate 187, which slides along the top of slide channel 185, and a T block 189 which is received within the slide channel and attached to the plate to guide the plate along the slide channel. The T block includes a threaded bore which receives a lead screw 191, the T block then defining a nut which is movable along the channel 185 by means of the lead screw. The inner end of the lead screw is anchored in a bearing block 193, providing a thrust bearing for the screw; and the screw extends to the side of the bed remote from the slide channel 179, and has attached a crank 195 for manually rotating the screw to position the plate 187 relative to the bed.

The upper surface of the plate 187 lies flush with the surface of the bed 21, and supports an upwardly exended pivot stud 197 defining a pivot axis for two elongated top chord channels 199 and 201, which are pivotally attached to the stud 197 at one end and are disposed to lie on the surface of the bed 21. These channels 199 and 201 may be positioned at any desired angle, and may be secured in relation to the slide channel 179 of the Whipple fixture. It will now be appreciated that fixture elements, including the clamps 181, may be positioned along the slide channel 179 to locate a horizontal bottom chord 203 of a roof truss, which would define the ceiling plane of a building structure; and that the channels 199 and 201 are employed to locate the top chords 205 of the roof truss, which define the roof planes for a building structure. The plate 187 of the center screw assembly 183 is appropriately positioned by means of the crank 195 to locate the apex of the roof truss at the appropriate distance from the slide channel 179 locating the bottom chord. As best seen in FIGURE 8, a clamp 181 is locked in position to engage one flange of top chord channel 201 and to clamp the wooden top chord 205 in butted relation to the wooden bottom chord 203, so that this joint is preliminarily assembled and in condition to be completed by embedding connector plates in the joint as above described. It will be appreciated that this Whipple roof truss fixture may be used with a bed 21 having the grid of wooden strips 65, or may be used with a bed which is not provided with such wooden strips.

It will also be appreciated that fixture clamps of the type shown in FIGURE 8 extend across the wooden members of the roof truss and, accordingly, are positioned to be damaged if engaged by the weight 59. It is apparent, however, that a weight suspending mechanism according to the present invention having means for precisely positioning and guiding the fall of the weight is particularly advantageous when used with fixtures of this type, since the weight may be aligned to impact a connector plate located close to one of these fixture clamps without risk of damaging the clamp.

According to a specific embodiment, a reinforced concrete slab 52 feet long, 15 feet wide and 12 inches deep prepared as aforesaid, carries a gantry-type frame 58 inches high with the A frame spaced 14 feet. The weight comprises a 6 inch thick 16 inch diameter steel plate weighing approximately 330 pounds welded to a 4 inch diameter black steel pipe having a 3.5 inch inner diameter, with the subassemblage of pipe and hammer weighing approximately 360 pounds. This pipe slides over a 3½ inch diameter black steel pipe having a 3.07 inch inner diameter. The length of the 4 inch pipe is 32 inches and that of the 3½ inch pipe is 30 inches. The hammer unit is supported by a Macraco-McMaster BBB coil chain, ¼ inch trade size, on a 3 inch diameter drum. This is driven by a ¾ H.P. Boston Gear Ratiomotor having a 175 r.p.m. output. The maximum rise of the weight is approximately 25 inches from the lower surface of the weight to the upper surface of the bed. The bed has transverse 2 x 4's mounted therein on 5 foot centers and longitudinal 2 x 4's mounted on 3 foot centers with the outermost longitudinal 2 x 4's being disposed 1.5 feet from the edges of the slab. The 2 x 4's are mounted in grooves or slots 3⅜ inches deep and 1¾ inches wide and 1¾ inches deep, thereby providing ⅛ inch shim spaces on three sides of the wooden members.

It will be apparent from the foregoing that there has been provided by this invention an apparatus for manufacturing an almost endless variety of roof trusses and like structural devices, which apparatus is relatively simple and thereby can be made available to trust fabricators, lumberyards and similar operators at only a fraction of the cost involved in the purchase or lease of presses of the type previously utilized to perform this function. In its most economical form, the utilization of this apparatus requires no jig fixtures whatsoever; the apparatus is also adapted for use with various forms of jig fixtures where a higher production rate is desired.

It will be appreciated that while a particular gantry type frame has been described and illustrated, other traveling frames may be utilized. Further, it is also feasible to suspend the weight suspension unit from an overhead frame, although the slab supported unit which is illustrated is more economical.

It will further be appreciated that the mechanism for lifting and releasing the weight, and its control, need not be necessarily completely carried on the carriage 57; that is, a portion of the power drive or the controls may be carried by one of the A frames of the gantry, for example, with suitable connection to the carriage movable along the rail structure 37.

It will be apparent to those skilled in the art that other weight lifting and suspension units may be utilized in order to obtain the advantages of the invention. For example, the weight may be supported by a rope wound around a drum similar to that herein described, one end of the rope being secured to the weight and the other adapted to be grasped by the operator. In the operation of this device, which is described in previously mentioned application Serial No. 512,652, of which the present application is a continuation-in-part, the drum would be rotated continuously by a power source, and the rope wound therearound would slip until the operator applies some force to the operator end of the rope, whereby the drum will cause the rope to lift the weight. The weight will be caused to fall by the operator releasing the force at the operator end of the rope, either with or without a deenergization of the drive motor.

It is also feasible to employ a weight carried on a vertically reciprocating rack which may be raised by gears engaging the rack and driven from a suitable control power source. Such a mechanism is also described in the above mentioned application Serial No. 512,652. Still other arrangements may be used, so long as they provide for a lifting of the weight and a release thereof for acceleration and impact.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed and desired to be secured by United States Letters Patent is:

1. An apparatus for manufacturing structural devices comprising wooden members having butt joints formed between the wooden members by toothed connector plates, comprising:

a bed defining a surface for receiving wooden members and connector plates for the fabrication of structural devices; said bed being formed of a substantially non-yielding and non-resilient material providing a hard surface;

a weight having a surface for engaging said connector plates; means for suspending said weight over said bed, said last named means including means providing for translational movement of said weight over said bed to permit positioning of the weight over the several connector plates used in forming the joints of the structural devices; said suspending means including means for lifting and releasing said weight to permit it to fall and thereby embed the teeth of said connector plates in said wooden members, said bed defining an elongated surface;

parallel track means secured to said bed adjacent the long sides thereof; wherein said means for suspending said weight over said bed comprises a gantry-type frame including upright frame members provided with grooved wheels for supporting said frame members on said track means and transverse rail means extending between said upright frame members;

and carriage means mounted for translational movement along said rail means, said carriage means supporting the weight, said carriage including a handle means extending laterally from said carriage, for grasping by an operator to position said gantry frame and said carriage relative to said bed to locate said weight at a selected position over said bed.

2. An apparatus for manufacturing structural devices as set out in claim 1 including means attached to said carriage for guiding said weight while it is lifted from said bed and released to fall to said bed.

3. An apparatus for manufacturing structural devices as set out in claim 2 wherein said guide means comprises telescoping pipe sections, one of said sections being rigidly attached to said carriage and another of said sections being attached to said weight.

4. An apparatus for manufacturing structural devices comprising wooden members having butt joints formed between the wooden members by toothed connector plates, comprising:

a bed comprising an elongated three dimensional body formed from a substantially non-yielding and non-resilient concrete mass, and having a flat abrasion resistant surface for receiving wooden members and connector plates; said bed surface being provided with a grid of wooden anchor strips, for temporarily attaching fixtures to said surface, the top surfaces of said anchor strips lying substantially flush with said bed surface; parallel tracks mounted on said bed surface along the long edges thereof;

a gantry type frame mounted for rolling movement along said tracks, comprising upright frame members provided with grooved wheels for rolling engagement with said tracks and transverse rail means extending between the upper ends of said upright frame members; a carriage mounted for rolling translational movement along said rail means; a weight suspended from said carriage for impacting against the members of a structural device lying on said bed; guide means for said weight comprising telescoping pipes, one of said pipes being rigidly attached to said carriage and another of said pipes being rigidly connected to said weight;

means for raising and releasing said weight including a drum rotatably mounted on said carriage, a flexible tension member connected between said drum and said weight and adapted to be wound around said drum to raise said weight, drive means operatively connected to said drum, and selectively engageable clutch means interposed between said drive means and said drum; means for suspending said weight comprising a ratchet member rotatable with said drum and pawl means pivotally mounted on said carriage for selective engagement with said ratchet member to prevent rotation of said drum in a direction to permit the fall of said weight;

handle means mounted on said carriage enabling an operator to position said gantry frame relative to said bed and said carriage relative to said gantry frame; and control means for said clutch and said pawl mounted adjacent to said handle means.

5. A bed for use in the manufacture of structural devices comprising wooden members having butt joints formed between the wooden members by toothed connector plates, comprising:

a three-dimensional body formed of a substantially non-yielding and nonresilient material providing a hard flat surface for receiving the wooden members and the connector plates of said structural devices, said body adapted to absorb impulse blows of a weight on said connector plates and wooden members;

and means provided on said surface of said body for locating the wooden members of a structural device in predetermined relation, said surface being provided with a network of wooden members permanently secured to said body whereby fixtures may be temporarily attached to said bed, said network of wooden members defining said means for locating the wooden members of said structural devices in predetermined assembled relation.

6. A bed for use in the manufacture of structural devices as set out in claim 5 wherein said network of wooden members comprises a grid of longitudinally and transversely spaced wood strips, substantially coextensive with the surface area of said bed.

7. A bed for use in the manufacture of structural devices comprising wooden members having butt joints formed between the wooden members by toothed connector plates, comprising:

a three-dimensional body formed of a substantially non-yielding and non-resilient material providing a hard flat surface for receiving the wooden members and the connector plates of said structural devices, said body adapted to absorb impulse blows of a weight on said connector plates and wooden members;

and means provided on said surface of said body for locating the wooden members of a structural device in predetermined relation, said surface being provided with a grid of grooves; wooden anchor members disposed in said grooves and secured to said body, the top surfaces of said anchor members lying substantially flush with said bed surface; said anchor members providing said means for locating the wooden members of said structural devices in predetermined assembled relation.

8. A bed for use in the manufacture of structural devices as set out in claim 7 wherein said body surface is provided with at least one longitudinal groove disposed adjacent to one side thereof, and a transverse groove disposed perpendicular to said longitudinal groove intermediate the ends of said bed; slide channel means disposed in said longitudinal groove and secured to said body, for receiving fixtures for locating a base member of a structural device; slide channel means disposed in said transverse groove; a slide block mounted on said last named slide channel means, and a lead screw assembly disposed within said channel means for selectively positioning said slide block relative to said channel; a pair of elongated guide members each pivotally attached to said slide block and disposed to lie on said bed surface, the other ends of said guide members adapted to be located relative to said longitudinal channel means to locate upper wooden members of a structural device.

9. A bed for use in the manufacture of structural devices comprising wooden members having butt joints formed between the wooden members by toothed connector plates, comprising:

a three-dimensional body formed of a substantially non-yielding and non-resilient material providing a hard flat surface for receiving the wooden members and the connector plates of said structural devices, said body adapted to absorb impulse blows of a weight on said connector plates and wooden members;

and means provided on said surface of said body for locating the wooden members of a structural device in predetermined relation, said surface being provided with at least one longitudinal groove disposed adjacent to one side thereof, and a transverse groove disposed perpendicular to said longitudinal groove intermediate the ends of said bed; slide channel means disposed in said longitudinal groove and secured to said body, for receiving fixtures for locating a base member of a structural device; slide channel means disposed in said transverse groove; a slide block mounted on said last named slide channel means, and a lead screw assembly disposed within said channel means for selectively positioning said slide block relative to said channel; a pair of elongated guide members each pivotally attached to said slide block and disposed to lie on said bed surface, the other ends of said guide members adapted to be located relative to said longitudinal channel means to locate upper wooden members of a structural device.

10. A bed for use in the manufacture of structural devices as set out in claim 7 including clamping fixtures disposed in said longitudinal channel means for engaging said guide members to clamp together in assembled butted relation the base wooden members and the upper wooden members of a structural device.

11. A weight suspension unit for use in connection with a flat bed in the manufacture of structural devices comprising wooden members having butt joints formed between the wooden members by toothed connector plates, comprising:

a gantry type frame having support wheels for rolling translational movement in one direction relative to a bed, said frame including a rail member extending in a direction transverse to said one direction of movement; carriage means mounted on said rail member for rolling translational movement therealong;

a weight having a surface for engaging a connector plate; means for suspending said weight, including means for lifting and releasing said weight to permit it to fall and thereby embed the teeth of a connector plate in a wooden member; and guide means mounted for translational movement with said carriage means for accurately directing the path of said weight upon release thereof.

12. A weight suspension unit as set out in claim 11 wherein said guide means comprises telescoping pipe sections, one of said sections being rigidly attached to said carriage and another of said sections being attached to said weight.

13. A weight suspension unit as set out in claim 12 wherein said means for lifting said weight includes a rotary drive member mounted on said carriage, and means coupling said rotary drive member and said weight; said coupling means extending through said telescoping pipe sections; and a rotary driving source for said rotary drive member.

14. A weight suspension unit as set out in claim 13 wherein said rotary drive member comprises a rotary drum; and wherein said coupling means comprises a flexible tension member wound about said drum and connected to said weight.

15. A weight suspension unit as set out in claim 11 wherein said means for lifting and releasing said weight includes a rotary drive member mounted on said carriage; and a rotary drive source for driving said rotary drive member.

16. A weight suspension unit as set out in claim 15 wherein said rotary drive member comprises a drum having one end of a flexible tension member attached thereto, the other end of said flexible member being attached to said weight.

17. A weight suspension unit as set out in claim 15 wherein said rotary drive member includes a rotary ratchet member; and wherein said means for suspending said weight includes a pawl manually operable to engage said ratchet member to prevent rotation of said rotary drive member in one direction, said weight urging rotation of said rotary drive member in said one direction.

18. A weight suspension unit as set out in claim 11 wherein said means for lifting and releasing said weight includes a rotary drive member mounted on said carriage and means coupling said rotary drive member and said weight; a rotary drive source for driving said rotary drive member and a releasable clutch interposed between said rotary source and said rotary drive member; and wherein said means for suspending said weight includes an annular ratchet member fixed to said rotary drive member and a pawl pivotally attached to said carriage and engageable with said ratchet member to prevent rotation of said rotary drive member in one direction, said weight urging rotation of said rotary drive member in said one direction.

19. A weight suspension unit as set out in claim 18 wherein said carriage includes handle means extending laterally therefrom for grasping by an operator to position said gantry frame and said carriage to locate said weight at a selected position over a bed; and manually operable control means for said clutch and said pawl, positioned adjacent to said handle means.

20. A weight suspension unit for use in connection with a flat bed in the manufacture of structural devices comprising wooden members having butt joints formed between the wooden members by toothed connector plates, comprising:

elongated rail means mounted for translational movement in a direction transverse to the length thereof; carriage means mounted for rolling translational movement along said rail means;

a weight suspended by said carriage; guide means for said weight comprising telescoping pipe sections, one of said sections being rigidly attached to said carriage means and another of said sections being rigidly connected to said weight; means on said carriage for lifting said weight including a rotary drive member and means coupling said rotary drive member to said weight; drive means for said rotary drive member, including a releasable coupling between said drive means and said rotary drive member, for lifting said weight to a desired height and releasing said weight to permit it to fall and thereby embed the teeth of a connector plate in wooden members supported on the bed.

21. A weight suspension unit as set out in claim 20 wherein said rotary drive member comprises a drum; wherein said means coupling said rotary drive member to said weight comprises a flexible tension member connected between said drum and said weight, adapted to be wound about said drum to lift said weight; and wherein said releasable coupling comprises a selectively engageable clutch.

22. A weight suspension unit as set out in claim 21 including a rotary ratchet member rotatable with said drum; pawl means mounted on said carriage for selective engagement with said ratchet member to prevent rotation of said drum in a direction to release said weight; and manually operable control means for said clutch and said pawl.

23. An apparatus for manufacturing structural devices comprising wooden members having butt joints formed between the wooden members by toothed connector plates, comprising:

a bed defining a surface for receiving wooden members and connector plates for the fabrication of structural devices; said bed being formed of a substantially non-yielding and non-resilient material providing a hard surface;

a weight having a surface for engaging said connector plates; means for suspending said weight over said bed, said last named means including means providing for translational movement of said weight over said bed to permit positioning of the weight over the several connector plates used in forming the joints of the structural device; said suspending means including means for lifting and releasing said weight to permit it to fall and thereby embed the teeth of said connector plates in said wooden members, said bed being formed of a concrete mass provided with a hardened abrasive resistant surface.

24. An apparatus for manufacturing structural devices comprising wooden members having butt joints formed between the wooden members by toothed connector plates, comprising:
- a bed defining a surface for receiving wooden members and connector plates for the fabrication of structural devices; said bed being formed of a substantially non-yielding and non-resilient material providing a hard surface;
- a weight having a surface for engaging said connector plates; means for suspending said weight over said bed, said last named means including means providing for translational movement of said weight over said bed to permit positioning of the weight over the several connector plates used in forming the joints of the structural devices; said suspending means including means for lifting and releasing said weight to permit it to fall and thereby embed the teeth of said connector plates in said wooden members, said surface being provided with a grid of wooden members secured to said bed, whereby fixtures may be temporarily attached to said bed for the purpose of locating the wooden members of said structural devices in predetermined assembled relation.

25. An apparatus for manufacturing structural devices comprising wooden members having butt joints formed between the wooden members by toothed connector plates, comprising:
- a bed defining a surface for receiving wooden members and connector plates for the fabrication of structural devices; said bed being formed of a substantially non-yielding and non-resilient material providing a hard surface;
- a weight having a surface for engaging said connector plates; means for suspending said weight over said bed, said last named means including means providing for translational movement of said weight over said bed to permit positioning of the weight over the several connector plates used in forming the joints of the structural devices; said suspending means including means for lifting and releasing said weight to permit it to fall and thereby embed the teeth of said connector plates in said wooden members, said surface being provided with a grid of grooves; wooden anchor members disposed in said grooves and secured to said bed, the top surfaces of said anchor members lying substantially flush with said bed surface; said anchor members providing means for temporarily attaching fixtures to said bed, for the purpose of locating the wooden members of said structural devices in predetermined assembled relation.

26. A bed for use in the manufacture of structural devices comprising wooden members having butt joints formed between the wooden members by toothed connector plates, comprising:
- a three-dimensional body formed of a substantially non-yielding and non-resilient material providing a hard flat surface for receiving the wooden members and the connector plates of said structural devices, said body adapted to absorb impulse blows of a weight on said connector plates and wooden members;
- and means provided on said surface of said body for locating the wooden members of a structural device in predetermined relation, said body being formed from reinforced concrete provided with a hardened abrasive resistant surface.

References Cited
UNITED STATES PATENTS

| | | | |
|---|---|---|---|
| 125,386 | 4/1872 | Gaillard | 100—265 X |
| 502,930 | 8/1893 | Mossberg | 72—440 |
| 695,567 | 3/1902 | Kuhn | 100—265 |
| 766,950 | 8/1904 | Hinde | 72—436 |
| 3,010,665 | 11/1961 | Smith | 100—265 |
| 3,036,516 | 5/1962 | Purcell | 100—265 X |
| 3,079,607 | 3/1963 | Jureit. | |
| 3,195,449 | 7/1965 | Jureit | 100—257 |

FOREIGN PATENTS

| | | |
|---|---|---|
| 313,459 | 7/1919 | Germany. |
| 315,531 | 11/1919 | Germany. |

BILLY J. WILHITE, *Primary Examiner.*